(No Model.)
A. F. HYDE.
PRINTING PRESS.
No. 294,048. Patented Feb. 26, 1884.
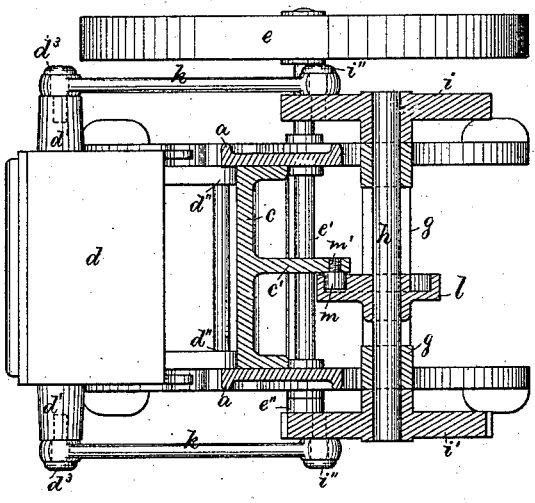
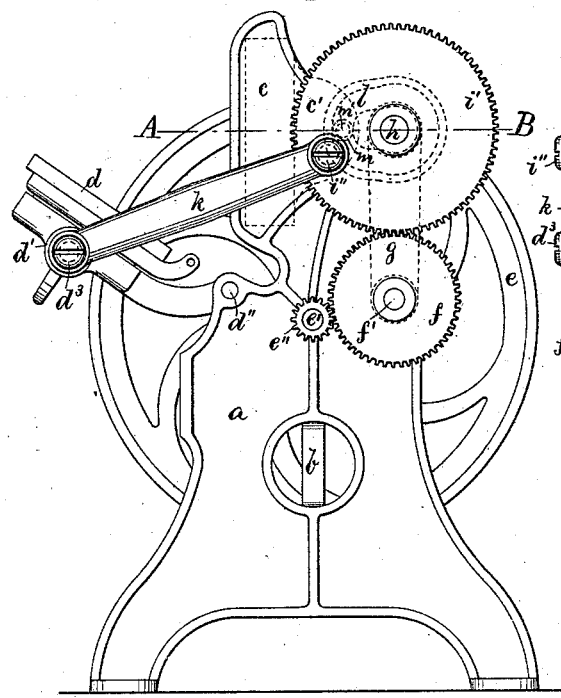
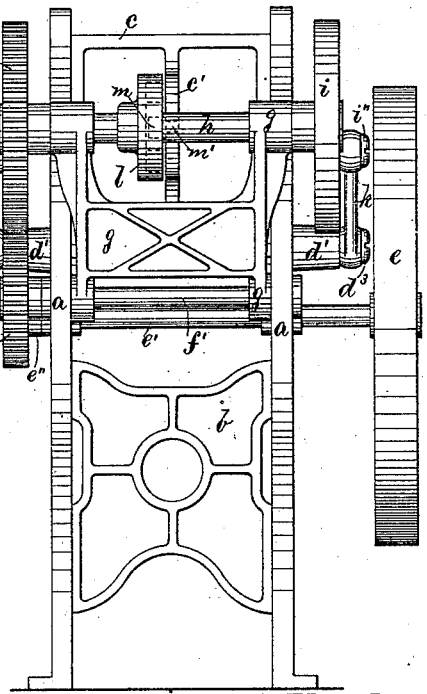
Witnesses
Henry Chadbourn.
C. A. Blackwell
Inventor
Abbe F. Hyde.
by Abba Andrew. his atty

UNITED STATES PATENT OFFICE.

ALBE F. HYDE, OF BOSTON, MASSACHUSETTS.

PRINTING-PRESS.

SPECIFICATION forming part of Letters Patent No. 294,048, dated February 26, 1884.

Application filed August 20, 1883. (No model.)

*To all whom it may concern:*

Be it known that I, ALBE F. HYDE, a citizen of the United States, residing at Boston, in the county of Suffolk and State of Massachusetts, have invented certain new and useful Improvements in Printing-Presses; and I do hereby declare that the same are fully described in the following specification and illustrated in the accompanying drawings.

This invention relates to improvements in printing-presses; and it has for its object to give a proper rest or "dwell" to the platen when at its lowest point, so as to give time to the operator for the removal of the printed sheet and replacing it by another piece to be printed, as will hereinafter be more fully described, reference being had to the accompanying drawings, where—

Figure 1 represents a side elevation of a printing-press provided with my improved mechanism. Fig. 2 represents a rear view of the same, and Fig. 3 represents a cross-section on the line A B, shown in Fig. 1.

Similar letters refer to similar parts wherever they occur on the different parts of the drawings.

In the drawings, $a\ a$ represent the usual upright frames, secured together at the proper distance apart by means of lower brace, $b$, and upper type-bed, $c$, and fastening-bolts in the ordinary way.

$d$ is the platen secured to the platen-yoke $d'$, the inner ends of which are pivoted at $d''$ to the frames $a\ a$, as usual.

$e$ is the balance-wheel, secured to the shaft $e'$, located in bearings in frames $a\ a$, as shown.

To one end of shaft $e'$ is secured the pinion $e''$, that gears into the gear-wheel $f$, secured to shaft $f'$, which latter is supported in bearings in the frames $a\ a$, as shown.

To the shaft $f'$ is jointed the oscillating link $g$, the upper ends of which serve as bearings for the crank-shaft $h$, to one of which is secured the crank-plate $i$, and to the other end the crank-plate $i'$, the latter having teeth on its circumference gearing into the teeth on the wheel $f$, as shown. Each of the crank-plates $i$ and $i'$ has a crank-pin, $i''$, to which is jointed the connecting-rod $k$, the forward end of which is jointed at $d^3$ to the platen-yoke $d'$, as shown in the drawings.

To the crank-shaft $h$ is secured the grooved cam-disk $l$, into the groove of which is located the roll $m$, running loosely on pin $m'$, secured to a stationary rear projection, $c'$, on the type-bed $c$, or to any other stationary part of the machine, as may be desirable. As the crank-shaft $h$ is revolved, a swinging motion is imparted to the link $g$ on its fulcrum-shaft $f'$ by the action of the grooved cam $l$ on the pin and roll $m\ m'$, and as a part of said grooved cam $l$ is circular, the link $g$ remains stationary as long as such circular part is acting on the pin and roll $m\ m'$; but when the eccentric part of the cam acts on said pin and roll an oscillating motion is imparted to link $g$, the crank-shaft $h$, its crank-plates $i\ i'$, and cranks $i''\ i'''$, which oscillation takes place just previous to and shortly after the platen $d$ reaches its lowest point, and by this means, when the platen $d$ reaches nearly to its lowest position by the action of the connecting links or rods $k\ k$ and their cranks $i''\ i''$, the cam $l$ causes the shaft $h$ to move backward with the same speed that the platen $d$ is moved downward by its cranks and crank-rods until the cranks pass by their dead-centers, after which the cam $l$ neutralizes the upward motion of the said cranks till the pin and roll $m\ m'$ reach the concentric part of the cam $l$, and in this manner the platen $d$ is kept stationary for a short time at or near the lower end of its stroke, so as to give proper time for the operator to remove the printed sheet from said platen and to put on a new sheet to be printed, and thus to facilitate the operation of the machine.

I do not confine myself to the precise construction of the cam $l$ as shown in the drawings, as it is only desirable that said cam shall be so constructed and arranged as to neutralize the action of the cranks during a portion of the revolution of the crank-shaft, so as to cause the platen to dwell or rest a short time when at its lowest point, for the purpose set forth.

I wish to secure by Letters Patent, and claim—

In a printing-press, the oscillating link $g$, shaft $h$, cam $l$, pin and roll $m\ m'$, cranks $i\ i'$, connecting-rods $k\ k$, and hinged platen-yoke $d'$, combined and arranged as and for the purpose set forth.

In testimony whereof I have affixed my signature in presence of two witnesses.

ALBE F. HYDE.

Witnesses:
ALBAN ANDRÉN,
HENRY CHADBOURN.